United States Patent [19]

Kondo

[11] Patent Number: 4,655,611
[45] Date of Patent: Apr. 7, 1987

[54] BALL SPLINE BEARING ASSEMBLY
[75] Inventor: Junji Kondo, Mino, Japan
[73] Assignee: Nippon Thompson Co., Ltd., Tokyo, Japan
[21] Appl. No.: 814,145
[22] Filed: Dec. 26, 1985
[30] Foreign Application Priority Data
  Dec. 28, 1984 [JP] Japan .................. 59-274857
[51] Int. Cl.[4] .......................................... F16C 29/06
[52] U.S. Cl. ..................................................... 384/45
[58] Field of Search ................ 308/6 C, 6 R, 6 A; 464/168; 384/45, 44, 43

[56]  References Cited
  U.S. PATENT DOCUMENTS
  2,945,366  7/1960  Sears ........................... 464/168
  4,327,949  5/1982  Borel ........................... 308/6 C
  4,572,590  2/1986  Teramachi ................... 308/6 C Primary Examiner—Lenard A. Footland
Attorney, Agent, or Firm—Alan H. MacPherson; Steven F. Caserza; Richard Franklin

[57]  ABSTRACT

A ball spline bearing assembly includes an outer, hollow cylinder, a guide shaft which extends through the cylinder and a plurality of balls interposed between the splined, opposite surfaces of the cylinder and the shaft. The cylinder is provided with an end member formed with a required number of connection passages at each end, so that two adjacent guide passages defined between the splined, opposite surfaces of the cylinder and the shaft are connected by the connection passage at each end thereby defining an endless path along which the balls can roll indefinitely. A tubular-shaped ball retainer is interposed between the shaft and the cylinder and is formed with a plurality of elongated windows. The ball retainer serves to keep the balls in rolling contact with both the cylinder and the shaft in a set of alternate straight guide passages; however in the other set of alternate straight guide passages they are in rolling contact with either the cylinder or the shaft.

4 Claims, 10 Drawing Figures

BALL SPLINE BEARING ASSEMBLY

BACKGROUND OF THE INVENTION

1. Field of the Invention

This invention generally relates to a spline bearing assembly, and in particular, to a ball spline bearing assembly which includes a plurality of balls interposed between a splined shaft and a splined cylinder which is fitted onto the shaft.

2. Description of the Prior Art

A ball spline bearing assembly is well known in the art, and it includes a shaft provided with a plurality of longitudinal inner grooves on its peripheral surface, a cylinder provided with a plurality of longitudinal outer grooves on its inner surface each opposing the corresponding one of the inner grooves thereby defining a straight passage, and a plurality of balls interposed between the shaft and the cylinder as fitted in the corresponding pair of inner and outer grooves. In such a ball spline bearing assembly, the shaft and the cylinder rotate in unison at all times however the shaft and the cylinder can move relative to each other in the longitudinal direction. For such a longitudinal relative motion to take place without limitation, the balls must be circulated in endless passages. In accordance with the prior art, a plurality of return passages are provided in the cylinder radially outward of the corresponding grooves. Such a structure requires the cylinder to be thicker and is difficult to manufacture.

SUMMARY OF THE INVENTION

In accordance with the present invention, there is provided a ball spline bearing assembly which includes a shaft provided with a plurality of longitudinal inner grooves, a cylinder provided with a plurality of longitudinal outer grooves each opposite to the corresponding one of the inner grooves thereby defining a straight passage, and a plurality of balls interposed between the shaft and the cylinder, whereby the cylinder is provided with a connecting means at each end for connecting one of the straight passages to another thereby defining an endless passage. In the preferred embodiment, one set of alternate straight passages are defined as load passages and the other set of straight passages are defined as return passages, whereby the balls in the load passages are in rolling contact with both the shaft and the cylinder and the balls in the return passages are in rolling contact with either the shaft or the cylinder.

It is therefore a primary object of the present invention to obviate the diadvantages of the prior art as described above and provide an improved ball spline bearing assembly.

Another object of the present invention is to provide an improved ball spline bearing assembly high in performance, low in resistance, and compact in size.

A further object of the present invention is to provide an improved ball spline bearing assembly simple and sturdy in structure and easy to manufacture.

Other objects, advantages and novel features of the present invention will become apparent from the following detailed description when considered in conjunction with the accompanying drawings.

DESCRIPTION OF THE PREFERRED EMBODIMENTS

Figure 1:
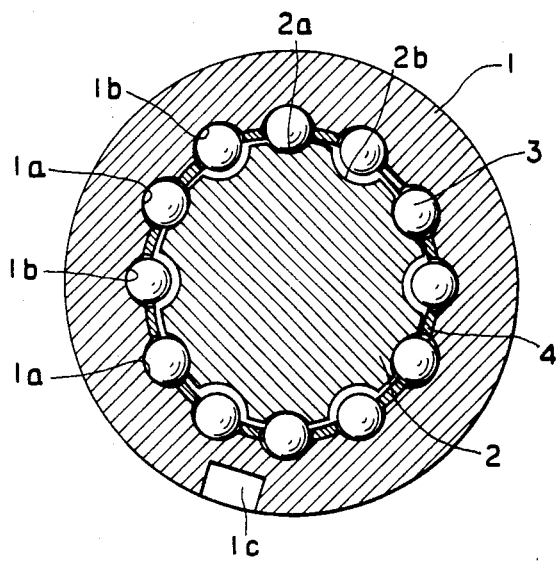
FIG. 1 is a transverse cross-sectional view showing a ball spline bearing assembly constructed in accordance with one embodiment of the present invention.

Referring now to FIG. 1, there is shown in transverse cross section a ball spline bearing assembly which generally comprises an outer, hollow cylinder 1 which extends longitudinally over a predetermined length and which is provided with a plurality of outer grooves 1a, 1b on its internal peripheral surface. Each of the outer grooves 1a, 1b is generally U-shaped in cross section and extends straight in parallel with the longitudinal axis of the cylinder 1. As explained later, although identically shaped in the illustrated embodiment, each outer groove 1a defines part of a load passage and each outer groove 1b defines part of a return passage. In the illustrated embodiment, the outer grooves 1a, 1b are arranged as spaced apart one from another at a predetermined pitch along the circumference of the internal surface of the cylinder 1. Inside of the cylinder 1 extends a guide shaft 2 which is generally circular in cross section and provided with a plurality of inner grooves 2a, 2b which extend straight in parallel with the longitudinal axis and are arranged at equal angular intervals along the outer peripheral surface of the shaft 2.

It is to be noted that each of the inner grooves 2a, 2b is located in radial alignment with the corresponding one of the outer grooves 1a, 1b so that a straight guide passage is defined between paired inner and outer grooves. In the illustrated embodiment, there are twelve inner and outer grooves, thus twelve straight passages are defined. It is to be also noted that, in the illustrated embodiment, the inner grooves 2a, 2b are all generally U-shaped in structure however a set of alternate inner grooves 2a which define part of the load passages as will be described later, are different in depth from the other set of alternate inner grooves 2b which define part of the return passages. In the illustrated embodiment, the set of inner grooves 2a are shallower in depth in the radial direction of the shaft 2 than the set of inner grooves 2b. It should be noted that although inner grooves 2a and 2b are shown to be significantly different in depth in FIG. 1, for the purpose of the present invention the actual difference can be very small. A keyway 1c is also formed in the outer cylinder 1.

As described above, since each of the outer grooves 1a, 1b formed on the inner peripheral surface of the outer cylinder 1 is in radial alignment with and located opposite to the corresponding one of the plurality of the inner grooves 2a, 2b formed on the outer peripheral surface of the shaft 2, a straight guide passage is defined between the corresponding pair of inner and outer grooves. These straight guide passages extend in parallel with the longitudinal center axis of the shaft 2. As shown in FIG. 1, the present ball spline bearing assembly includes a plurality of balls 3 which are fitted in the straight guide passages defined by the paired inner and outer grooves between the outer cylinder 1 and the shaft 2. It should be noted that the balls 3 in the load passages defined between the paired outer and inner grooves 1a and 2a are in rolling contact with both the outer and inner grooves 1a and 2a. On the other hand, the balls 3 in the return passages defined between the outer and inner grooves 1b and 2b are only in rolling contact with the outer grooves 1b since inner grooves 2b are deeper than the inner grooves 2a. To hold the balls 3 in the return path away from inner groove 2b, a ball retainer 4, tubular in shape, is fitted between the outer cylinder 1 and the shaft 2. As described in detail later, the ball retainer 4 is formed with a plurality of slots for receiving the balls 3 in the return passages are slightly narrower than the diameter of the balls 3 so that the balls 3 in the return passages are retained between the ball retainer 4 and the outer cylinder 1.

With this structure, a rotational force may be transmitted between the outer cylinder 1 and the shaft 2 through the balls 3 because they are constrained to rotate in unison through engagement of the balls 3; however, since the balls 3 in the load passages defined between the paired outer and inner grooves 1a and 2a are in rolling contact with both the outer and inner grooves 1a and 2a which extend parallel to the longitudinal axis of the shaft 2, a relative translational motion can be provided between the outer cylinder 1 and the shaft 2. In addition, in the present invention, since an endless path is defined by two adjacent straight passages each defined by paired outer and inner grooves, such a relative translational motion can be provided, over the length of the shaft 2.

Figure 2:
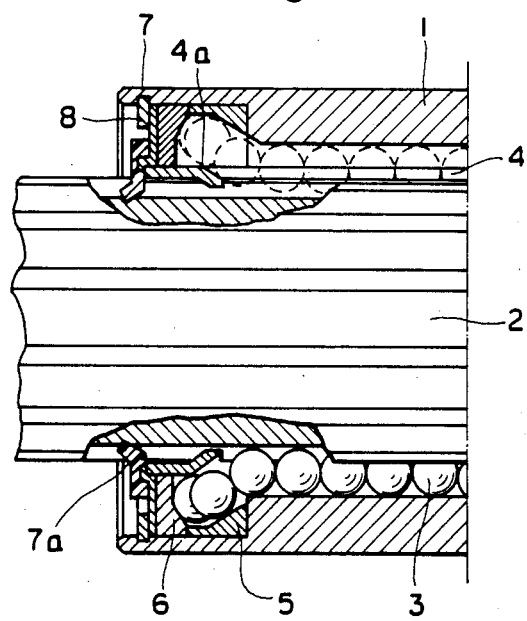
FIG. 2 is a fragmentary, partially cross-sectional, longitudinal view of the ball spline bearing assembly shown in FIG. 1.

FIG. 2 shows in fragmentary, transverse cross section, the structure of an end member provided at one end of the outer cylinder 1 for providing a connection passage which connects one of the load passages defined between paired outer and inner grooves 1a and 2a to the corresponding adjacent return passage defined between paired outer and inner grooves 1b and 2b. Described more in detail, the bottom or top end of the outer cylinder 1 is formed with an internally recessed portion in which an end member upper half 5 and then an end member lower half 6 are fitted, whereby the end member upper and lower halves, when so combined, define a connection passage for each pair of two adjacent load and return passages. In the illustrated embodiment, since there are twelve straight guide passages, i.e., six load and six return passages, the end member top and bottom halves 5 and 6 define six connection passages. Thus, the balls 3 in the load passage move into the connection passage defined in the end member 5-6 and then the balls 3 roll into the associated return passage.

Figure 3:
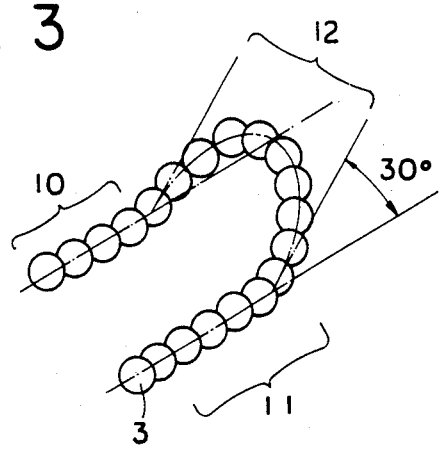
FIG. 3 is a schematic, perspective view showing how an endless passage is defined in the ball spline bearing assembly shown in FIGS. 1 and 2.

As shown in FIG. 2, a steel reinforcing plate 7 is also provided for holding the end member top and bottom halves 5 and 6 and the ball retainer 4 in position. A seal 7a is fixedly attached to the reinforcing plate 7, and it has a portion extending downward so as to seal the corresponding passage. A fixing member 8, in the form of a clip, is also provided in abutment against the reinforcing plate 7 so that the elements 4, 5, 6 and 7 are all fixed in position. FIG. 3 shows how a connection passage 12 is defined by a combination of the end member top and bottom halves 5 and 6. As shown in FIG. 3, this connection passage 12 is in communication with a load passage 10 which is defined by a pair of opposed outer and inner grooves 1a and 1b and also with a return passage 11 which is defined by a pair of opposed outer and inner grooves 2a and 2b. Another connection passage 12 is provided at the other end of the load and return passages and thus an endless path is defined by the load passage 10, return passage 11 and a pair of connection passages 12 each connecting the corresponding ends of the load and return passages 10 and 12. Accordingly, the balls may roll along such an endless path so that a relative translational motion may be provided between the outer cylinder 1 and the shaft 2. In the illustrated embodiment, the connection path 12 is inclined 30° with respect to the plane definable by the central axes of the associated load and return passages 10 and 11. Thus, in this embodiment, the maximum thickness of the outer cylinder 2 is determined by the height or radial expanse of the connection passage 12.

Figure 4A:
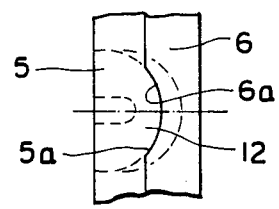
FIGS. 4a and 4b are schematic illustrations showing part of an end member provided at each end of the outer cylinder in the ball spline bearing assembly shown in FIGS. 1 and 2.
Figure 4B:
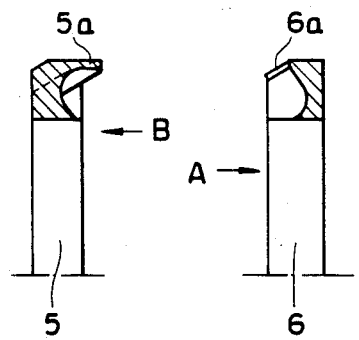
Figure 5A:
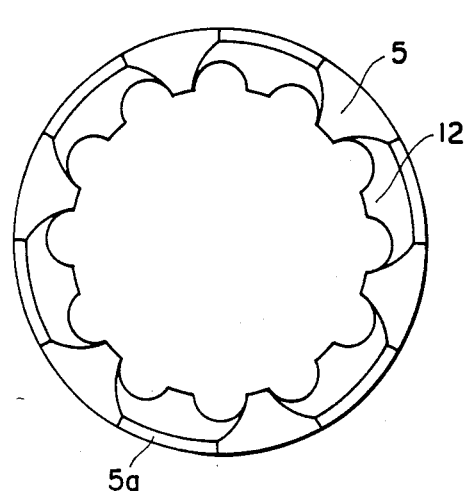
FIGS. 5a and 5b are plan views showing the upper and lower halves, respectively, which are combined to define the end member shown in FIGS. 4a and 4b.
Figure 5B:
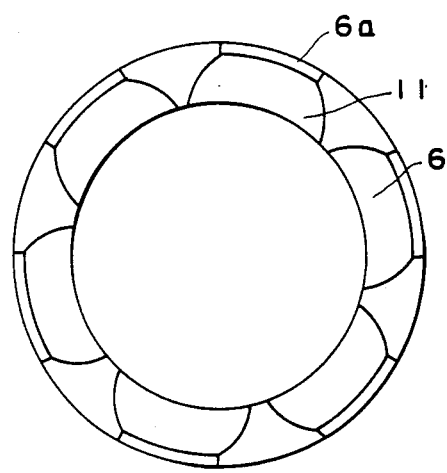

FIGS. 4a and 4b show how the end member upper and lower halves 5 and 6 are combined to define the connection passage 12. As shown in FIG. 4a, the end member upper or top half 5 is provided with a projection 5a which projects rearwardly generally in compliance with the shape of the corresponding connection passage 12, and similarly the end member lower or bottom half 6 is provided with a dent 6a which is complementary in shape with the associated projection 5a. Thus, the relative position between the end member upper and lower halves 5 and 6 can be easily set through engagement between the projection 5a and the dent 6a. FIG. 4b shows in axial cross section the structure of each of the end member upper and lower halves 5 and 6. In addition, FIGS. 5a and 5b show in plan view the end member upper and lower halves 5 and 6 when viewed in the directions B and A indicted in FIG. 4b, respectively. Six connection passages 12 are formed when the end member upper and lower halves 5 and 6 are combined and each of the connection passages 12 communicates with the two adjacent load and return passages 10 and 11. Preferably, the end member upper and lower halves 5 and 6 are formed from a plastic material, such as a synthetic resin.

Figure 6A:
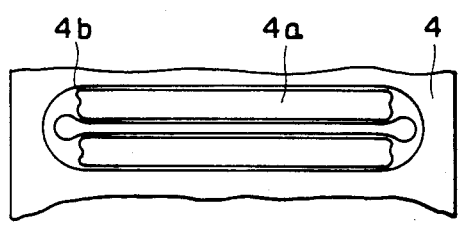
FIGS. 6a through 6c are schematic illustrations showing the structure of the ball retainer 4 provided in the ball spline bearing assembly shown in FIGS. 1 and 2.
Figure 6B:
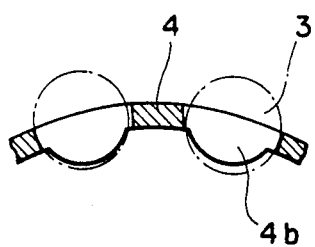
Figure 6C:
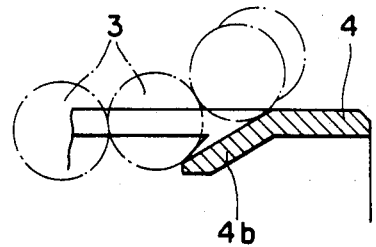

FIGS. 6a through 6c show the structure of the ball retainer 4. As shown in FIG. 6a, the ball retainer 4 is formed with a plurality of elongated windows 4a each aligned with the corresponding one of the straight guide passages including the load and return passages 10 and 11. It is to be noted that at least those windows 4a located in alignment with the return passages 11 are dimensioned to have a width which is slightly smaller than the diameter of the balls 3, so that the balls 3 are constrained between the outer grooves 1b of the outer cylinder 1 and the side edges of the associated window 4a of the ball retainer 4. On the other hand, the windows 4a located in alignment with the load passages 10 may be dimensioned slightly larger than the diameter of the balls 3, if desired, though they may also be slightly smaller than the diameter of the balls 3 as long as the balls 3 roll between the paired outer and inner grooves 1a and 2a. As also shown in FIGS. 6a through 6c, a tongue portion 4b is formed at each end of the window 4a such that the balls 3 may move smoothly between the load or return passage 10, 11 and the connection passage 12. For this purpose, the tongue projection 4b extends radially outwardly at an angle from the end of the window 4a.

While the above provides a full and complete disclosure of the preferred embodiments of the present invention, various modifications, alternate constructions and equivalents may be employed without departing from the true spirit and scope of the invention. For example, the inner grooves 2a and 2b formed on the shaft 2 may be made the same in depth and the outer grooves 1a and 2b formed on the outer cylinder 1 may be varied in depth. Therefore, the above description and illustration should not be construed as limiting the scope of the invention, which is defined by the appended claims.

What is claimed is:

1. A ball spline bearing assembly comprising:
    a shaft extending straight over a distance and provided with a plurality of straight inner grooves formed at its outer peripheral surface;
    an outer, hollow cylinder through which said shaft extends, said cylinder including a like plurality of straight outer grooves each located opposite to the corresponding one of said plurality of inner grooves thereby defining a straight guide passage by a pair of associated inner and outer grooves;
    connecting means provided at each end of said cylinder for connecting two adjacent, associated straight guide passages thereby forming an endless guide path, said connecting means includes a ring-shaped end member upper half and a ring-shaped end member lower half, which are fitted into an end recess formed at each end of said cylinder, said upper half and lower half defining a plurality of connection passages each connecting a pair of associated straight guide passages;
    a plurality of balls provided to roll along said endless guide path;
    retaining means interposed between said shaft and said cylinder as fixedly attached to said cylinder for retaining said plurality of balls in position; and
    whereby alternate ones of either of said inner or outer grooves are deeper than the rest so that the balls are in rolling contact with both of said inner and outer grooves in a set of alternate ones of said straight guide passages but the balls are in rolling contact with either one of said inner and outer grooves in the outer set of alternate ones of said straight guide passages.

2. The assembly of claim 1 wherein said inner and outer grooves are both generally U-shaped in cross section.

3. The assembly of claim 2 wherein said retaining means includes a tubular-shaped ball retainer which is interposed between said shaft and said cylinder and which is provided with a plurality of elongated windows each of which is located in registry with the associated one of said straight guide passages, whereby at least those windows in registry with those straight guide passages where the balls are in rolling contact with only either of said inner or outer grooves have a width which is slightly smaller than the diameter of said balls.

4. The assembly of claim 3 wherein said ball retainer is provided with a tongue at each end of each of said windows thereby guiding the movement of said balls between the connection passage and the straight guide passage smoothly.

* * * * *